(12) United States Patent
Hori et al.

(10) Patent No.: US 11,580,272 B2
(45) Date of Patent: Feb. 14, 2023

(54) 3D MODEL CREATION SUPPORT SYSTEM AND 3D MODEL CREATION SUPPORT METHOD

(71) Applicant: Hitachi, Ltd., Tokyo (JP)

(72) Inventors: Yoshinari Hori, Tokyo (JP); Tomotoshi Ishida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 211 days.

(21) Appl. No.: 16/871,483

(22) Filed: May 11, 2020

(65) Prior Publication Data

US 2020/0410142 A1  Dec. 31, 2020

(30) Foreign Application Priority Data

Jun. 26, 2019  (JP) .............................. JP2019-118247

(51) Int. Cl.
| | |
|---|---|
| *G06F 30/17* | (2020.01) |
| *G06F 30/23* | (2020.01) |
| *G06T 17/10* | (2006.01) |
| *G06F 113/14* | (2020.01) |

(52) U.S. Cl.
CPC .............. *G06F 30/17* (2020.01); *G06F 30/23* (2020.01); *G06T 17/10* (2013.01); *G06F 2113/14* (2020.01)

(58) Field of Classification Search
CPC ...... G06F 30/17; G06F 30/23; G06F 2113/14; G06T 17/10
See application file for complete search history.

(56) References Cited

U.S. PATENT DOCUMENTS

2005/0216237 A1* 9/2005 Adachi .................. G06T 17/00
 703/1
2009/0064077 A1  3/2009 Uppaluri et al.
2010/0333038 A1* 12/2010 Sato ........................ G06F 30/00
 710/316

(Continued)

FOREIGN PATENT DOCUMENTS

| JP | 7-103400 A | 4/1995 | |
|---|---|---|---|
| JP | 4940267 B2 | 5/2012 | |
| WO | WO-2011155539 A1 * | 12/2011 | ......... G06F 17/5009 |

OTHER PUBLICATIONS

Son et al. Knowledge-Based Approach for 3D Reconstruction of As-Built Industrial Plant Models From Laser-Scan Data pp. 885-893 (2013 Proceedings of the 30th ISARC, Montreal, Canada, ISBN 978-1-62993-294-1, ISSN 2413-5844) (Year: 2013).*

(Continued)

*Primary Examiner* — Iftekhar A Khan
(74) *Attorney, Agent, or Firm* — Mattingly & Malur, PC

(57) ABSTRACT

An object of the invention is to efficiently create a 3D model of a plant with attributes from a 3D model of a plant with no attributes. In order to solve the above problems, in the invention, a connection information conversion part 5 converts a connection relationship of parts extracted from a 3D model with no attributes 2 into connection information of a system diagram, an extraction information comparing part 6 compares the connection information with the connection relationship extracted from an attribute system diagram to create an conversion correspondence DB 7, and a 3D model with attributes 9 is created based on the conversion correspondence DB from the 3D model with no attributes 2.

10 Claims, 10 Drawing Sheets

(56) References Cited

U.S. PATENT DOCUMENTS

| | | | |
|---|---|---|---|
| 2016/0116911 A1* | 4/2016 | Yamamoto | G06F 16/9024 |
| | | | 700/98 |
| 2017/0066092 A1* | 3/2017 | Yamamoto | G05B 17/02 |
| 2017/0068773 A1* | 3/2017 | Wang | G06F 30/17 |
| 2017/0115847 A1* | 4/2017 | Barras | G06F 3/04883 |
| 2017/0323035 A1* | 11/2017 | Hori | G06K 9/00 |
| 2018/0052948 A1* | 2/2018 | Onodera | G06F 30/00 |
| 2019/0061269 A1* | 2/2019 | Messner | B29C 64/40 |
| 2019/0347381 A1* | 11/2019 | Benjamin | G06F 30/20 |
| 2020/0293828 A1* | 9/2020 | Wang | G06V 10/95 |
| 2020/0410142 A1* | 12/2020 | Hori | G06T 17/10 |
| 2021/0133670 A1* | 5/2021 | Cella | G06N 5/04 |

OTHER PUBLICATIONS

Japanese Office Action received in corresponding Japanese Application No. 2019-118247 dated Dec. 13, 2022.

\* cited by examiner

| No | EQUIPMENT TYPE | EQUIPMENT NUMBER | SIZE | REMARK |
|---|---|---|---|---|
| 1 | TANK | Tank-01 |  | CAPACITY: 40 [m$^3$] |
| 2 | PUMP | Pump-01 | - | CENTRIFUGAL PUMP |
| 3 | PUMP | Pump-02 | - | CENTRIFUGAL PUMP |

| No | PIPE NUMBER | PIPE SIZE [mm] | HEAT INSULATING THICKNESS [mm] |
|---|---|---|---|
| 1 | Line-01 | 216.3 | 0 |
| 2 | Line-02 | 216.3 | 0 |
| 3 | Line-03 | 216.3 | 0 |
| 4 | Line-04 | 165.2 | 15 |
| 5 | Line-05 | 165.2 | 15 |
| : | : | : | : |

| No | PIPE NUMBER | From | To |
|---|---|---|---|
| 1 | Line-01-01 | Tank-01 | V-01 |
| 2 | Line-01-02 | F-01 | Pump-01 |
| 3 | Line-02-01 | Pump-01 | Branch-01 |
| 4 | Line-02-02 | Branch-01 | V-02 |
| 5 | Line-02-03 | V-02 | R-01 |
| 6 | Line-03-01 | Branch-01 | V-03 |
| ⋮ | ⋮ | ⋮ | ⋮ |

| No | OBJECT ID | From | To |
|---|---|---|---|
| 1 | Obj-101 | - | Obj-102 |
| 2 | Obj-102 | Obj-101 | Obj-103,Obj-151 |
| 3 | Obj-103 | Obj-102 | Obj-104 |
| 4 | Obj-104 | Obj-103 | Obj-105 |
| 5 | Obj-105 | Obj-104 | Obj-106 |
| : | : | : | : |

FIG. 10
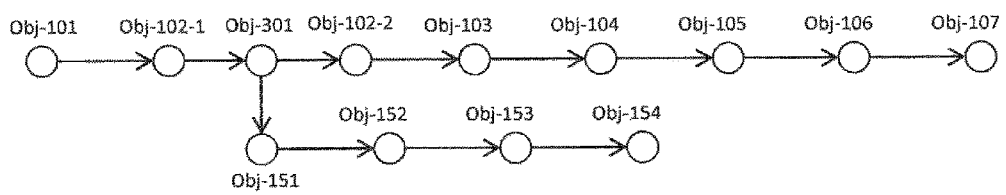
FIG. 11
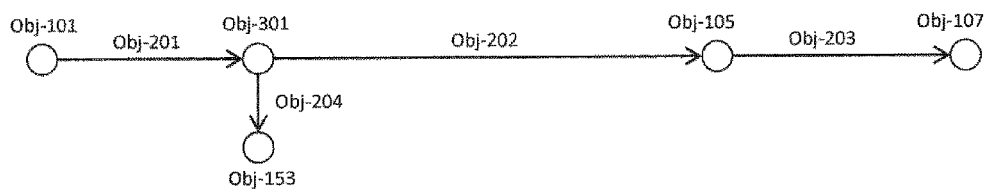
FIG. 12
| No | PRE-CONVERSION ID | POST-CONVERSION ID |
|---|---|---|
| 1 | Obj-101 | Obj-101 |
| 2 | Obj-102-1 | Obj-201 |
| 3 | Obj-102-2 | Obj-202 |
| 4 | Obj-103 | Obj-202 |
| 5 | Obj-104 | Obj-102 |
| 6 | Obj-105 | Obj-105 |
| ⋮ | ⋮ | ⋮ |

| No | PRE-CONVERSION ID | POST-CONVERSION ID | P&ID NUMBER |
|---|---|---|---|
| 1 | Obj-101 | Obj-101 | Pump-01 |
| 2 | Obj-102 | Obj-201 | Line-02-01 |
| 3 | Obj-103 | Obj-201 | Line-02-01 |
| 4 | Obj-104 | Obj-201 | Line-02-01 |
| 5 | Obj-105 | Obj-105 | R-01 |
| 6 | Obj-106 | Obj-202 | Line-02-02 |
| : | : | : | |

ATTRIBUTE SYSTEM DIAGRAM

| No | | END POINT (1) | END POINT (2) | NUMBER OF NODES |
|---|---|---|---|---|
| 1 | BRANCH GRAPH P1 | Tank-01 (END POINT, Equipment) | Branch-01 (BRANCH, Branch) | 4 |
| 2 | BRANCH GRAPH P2 | Branch-01 (BRANCH, Branch) | V-03 (END POINT, Valve) | 2 |
| 3 | BRANCH GRAPH P3 | Branch-01 (BRANCH, Branch) | R-01 (BRANCH, Equipment) | 3 |
| 4 | BRANCH GRAPH P4 | R-01 (BRANCH, Equipment) | V-07 (END POINT, Valve) | 4 |
| 5 | BRANCH GRAPH P5 | R-01 (BRANCH, Equipment) | V-06 (END POINT, Valve) | 5 |

FIG. 20

| No | | END POINT (1) | END POINT (2) | NUMBER OF NODES |
|---|---|---|---|---|
| 1 | BRANCH GRAPH D1 | Obj-111 (END POINT, Equipment) | Obj-301 (BRANCH, Branch) | 4 |
| 2 | BRANCH GRAPH D2 | Obj-301 (BRANCH, Branch) | Obj-153 (END POINT, Valve) | 2 |
| 3 | BRANCH GRAPH D3 | Obj-301 (BRANCH, Branch) | Obj-107 (BRANCH, Equipment) | 3 |
| 4 | BRANCH GRAPH D4 | Obj-107 (BRANCH, Equipment) | Obj-115 (END POINT, Valve) | 4 |
| 5 | BRANCH GRAPH D6 | Obj-107 (BRANCH, Equipment) | Obj-132 (END POINT, Valve) | 5 |

FIG. 21

STEP S2-1: CLASSIFY BRANCH GRAPHS BY NUMBER OF NODES

STEP S2-2: COMPARE BRANCH GRAPHS HAVING SAME NUMBER OF NODES, AND ASSOCIATE END POINTS OF BRANCH GRAPHS WHOSE NODE DIVISIONS AND NODE ATTRIBUTES CORRESPOND ONE-BY-ONE

STEP S2-3: FOR THOSE WHOSE ASSOCIATION CANNOT BE SPECIFIED, COMPARE NODE DIVISIONS AND NODE ATTRIBUTES OF NODES OTHER THAN END POINTS, AND MAKE ASSOCIATION

3D MODEL CREATION SUPPORT SYSTEM AND 3D MODEL CREATION SUPPORT METHOD

CLAIM OF PRIORITY

The present application claims priority from Japanese Patent Application JP 2019-118247 filed on Jun. 26, 2019, the content of which are hereby incorporated by references into this application.

BACKGROUND OF THE INVENTION

1. Field of the Invention

The present invention relates to a technique for supporting a creation of a 3D-CAD model (hereinafter, referred to as 3D model).

2. Description of the Related Art

In recent years, an asset in a power plant or a chemical plant is managed using a 3D-CAD.

On the other hand, some of these plants have an old construction period, do not have a 3D model, and implement asset management using a paper document.

Therefore, in the recent years, a service that acquires three-dimensional point group data by laser measurement and creates a 3D model for a plant based on the data is generalized.

With a current laser measuring apparatus, highly accurate three-dimensional point group data can be obtained, and an apparatus that obtains color information by a camera simultaneously with coordinate data is developed. Therefore, colored three-dimensional point group data can be displayed, and thus, a pipe, equipment or the like can be easily identified by human eyes.

However, since those point group data is not a 3D model having an attribute, in order to use the point group data for the asset management using tag information of the equipment or the pipe, it is necessary to convert those point group data into a 3D model with attributes.

Such a conversion work to the 3D model is generally performed by a method in which an operator manually converts the point group data into the 3D model while displaying the point group data on a screen. Although a great deal of labor is required for the conversion, in the recent years, a shape of the pipe or the like can be automatically recognized by software and converted into a 3D pipe model. However, in order to utilize the 3D model for an application such as the asset management, it is necessary to assign not only a shape of the 3D model, but also attribute information of the pipe such as a pipe number, an outer diameter, and a wall thickness.

Japanese Patent No. 4940267 discloses one method for improving an efficiency of such an attribute assignment work. Japanese Patent No. 4940267 discloses "including a logical designing part that generates and stores logical connection data, which is a logical connection relationship between plant equipment, a geometry designing part that generates and stores geometry data that is graphical shape information in a three-dimensional space, and a data linking part including an automatic correspondence table generating part that compares end point connection information of logical connection information with end point connection information of the geometry data, and automatically generates a logical connection and geometry correspondence table including correspondence data that associates the logical connection data with the geometry data of which the end point connection data are matched each other". Therefore, "at the same time as or prior to creation of the logical connection data by the logical designing part, the geometry data in the three-dimensional space can be created by the geometry designing part, and the generated geometry data can be automatically associated with the logical connection data after the creation is completed."

However, when an attempt is made to assign the attribute to a 3D model with no attributes of the plant due to aging or the like using the technology disclosed in Japanese Patent No. 4940267, it is necessary to carry out the attribute assignment work for each pipe, and a very large number of man-hours are required. In addition, Japanese Patent No. 4940267 describes that the geometry data is automatically associated with the logical connection data. However, no consideration is given to a case where an object serving as a unit configuration component is different for each data. As the case where the unit configuration component is different, for example, there is a case of a Piping & Instrument Flow Diagram (P&ID) and the 3D model. Dealing with such a case is also one of the objects of the invention.

SUMMARY OF THE INVENTION

In order to solve the above problem, the invention adopts the following parts.

According to the invention, a matching can be performed by using definition information included in design information such that information having different granularities (for example, a 3D model and system information) relating to a target configured with a plurality of objects having a connection relationship can be matched. For this purpose, according to one aspect of the invention, connection information of an object is extracted from each piece of information, and the connection information from at least one piece of information is converted to perform the matching. In addition, the invention includes converting the connection information of the 3D model among the 3D model and the system information to enable the matching.

As an example of a more specific aspect, there is a 3D model creation support system including a system information extraction part configured to extract connection information from an attribute system diagram, a 3D model connection information extraction part configured to extract connection information from a 3D model with no attributes, a connection information conversion part configured to convert the connection information extracted from the 3D model connection information extraction part into a format that can be compared with a system diagram, an extraction information comparing part configured to compare the information extracted from these two and create a conversion correspondence DB, and an attribute assigning part configured to assign attributes to the 3D model with no attributes based on the conversion correspondence DB to create a 3D model with attributes. "No attributes" in the invention includes a case where attributes are assigned to a part of objects, or a case where it is necessary to change at least a part of the attributes even though the attribute is assigned to each object.

According to the invention, the 3D model with attributes can be efficiently created from the 3D model with no attributes.

BRIEF DESCRIPTION OF THE DRAWINGS

FIG. 10 is a diagram showing an example of a network diagram of the 3D model with no attributes.

FIG. 11 is a diagram showing an example of a diagram obtained by converting a network of the 3D model with no attributes.

FIG. 12 is a diagram showing an example of a conversion correspondence of the 3D model.

FIG. 20 shows the branch graph management information (part 2).

FIG. 21 is a diagram showing a processing flow of matching directed graphs.

DESCRIPTION OF THE PREFERRED EMBODIMENTS

An embodiment of the invention will be described below with reference to the drawings.

Figure 1:
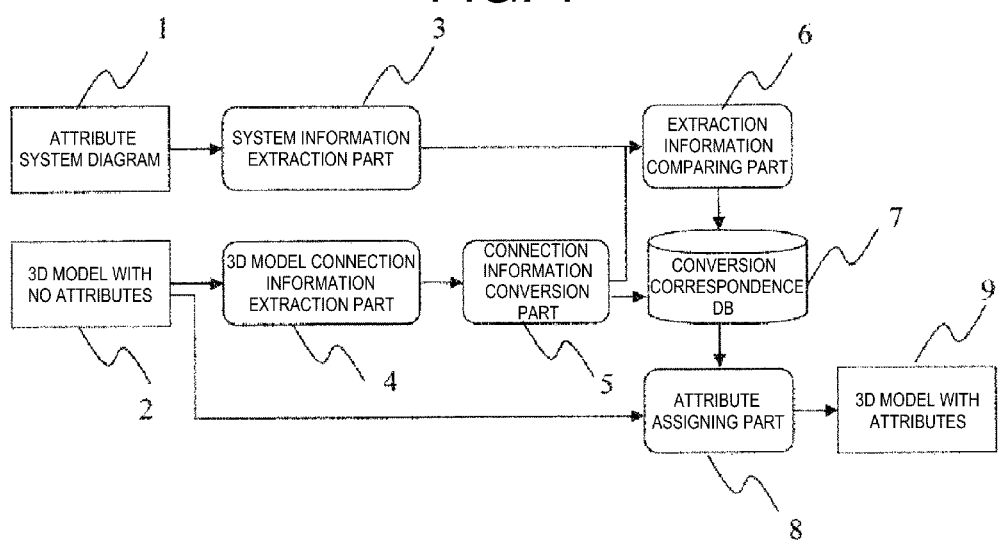
FIG. 1 is a diagram showing a configuration of a plant 3D model creation system according to a first embodiment of the invention.

FIG. 1 is an example of a configuration diagram of a plant 3D model creation system. Although the present embodiment is directed to plant data, it can be applied to other targets constructed and configured by connecting a plurality of parts (objects), separately.

The present embodiment includes an attribute system diagram 1, a 3D model with no attributes 2, a system information extraction part 3, a 3D model connection information extraction part 4, a connection information conversion part 5, an extraction information comparing part 6, a conversion correspondence DB 7, an attribute assigning part 8, and a 3D model with attributes 9.

The attribute system diagram 1 shows a P&ID created by a CAD for P&ID. Since the attribute system diagram is created by the CAD for P&ID, not only drawing information but also, for example, attribute information such as a pipe number, an outer diameter, and a wall thickness is added to a line segment indicating a pipe. In addition, connection information between a pipe, and equipment or a valve is also included.

The 3D model with no attributes 2 is a 3D model of the pipe, the equipment, the valve or the like, but does not store the attribute information added to the P&ID. However, in order to create the 3D model of the pipe, there is also CAD software that requires an input of the pipe number, and therefore in this case, a temporary pipe number is input.

The system information extraction part 3 acquires system connection information from the attribute system diagram 1. As described above, the attribute system diagram 1 is created by the CAD for P&ID, so that the valve and the equipment connected to each pipe, or the pipes can be automatically acquired by a program. In addition, information on a flow direction of a fluid is also added to the pipe. The system information extraction part 3 acquires, from these information, directed graph data in which the pipe is an edge, and the equipment and the valve are nodes.

The 3D model connection information extraction part 4 acquires the connection information from the 3D model. Also in the 3D model, the pipe is connected to the valve and the equipment, and as long as a CAD is a normal plant-based CAD, these pieces of connection information are included. In addition, even when the connection information is not included, since the pipe, the valve and the equipment are connected in a model space, the connection information can be acquired as a physical connection relationship between arranged parts. The 3D model connection information extraction part 4 acquires these pieces of connection information and creates a directed graph. However, the 3D model includes connection information different from the P&ID since a model is created in units of parts constituting an actual plant. This part is called an object. For example, on the P&ID, a pipe is displayed by one line, but the pipe is actually configured with a plurality of parts such as a straight pipe, an elbow, and a straight pipe. The 3D model connection information extraction part 4 acquires the connection information for the units of parts.

In the connection information conversion part 5, the connection information extracted by the 3D model connection information extraction part 4 is converted into a format that can be compared with the connection information of the P&ID, a correspondence between original information and converted information is stored in the conversion correspondence DB.

The extraction information comparing part 6 compares P&ID graph data output from the system information extraction part 3 with 3D model graph data output from the connection information conversion part 5. Since a connection relationship of the 3D model includes a graph structure the same as that of the P&ID by the connection information conversion part 5, the correspondence between these two can be compared. As a result of the comparison, a correspondence table between these two is output to the conversion correspondence DB 7.

The conversion correspondence DB 7 includes two types of conversion correspondence information. One is information when the connection information conversion part 5 changes the connection information of the 3D model into the format that can be compared with the P&ID, and the other one is correspondence information between the pipe number assigned to the P&ID and a temporary number of the pipe extracted from the 3D model.

The attribute assigning part 8 assigns P&ID attribute information to the 3D model in a lump based on information in the conversion correspondence DB 7 by the program. As a result, the 3D model with attributes 9 is created.

Hereinafter, each configuration component will be described in detail. The present system is realized by a so-called computer, and a function of each configuration component is executed by an operation of the present system according to the program.

Figure 2:
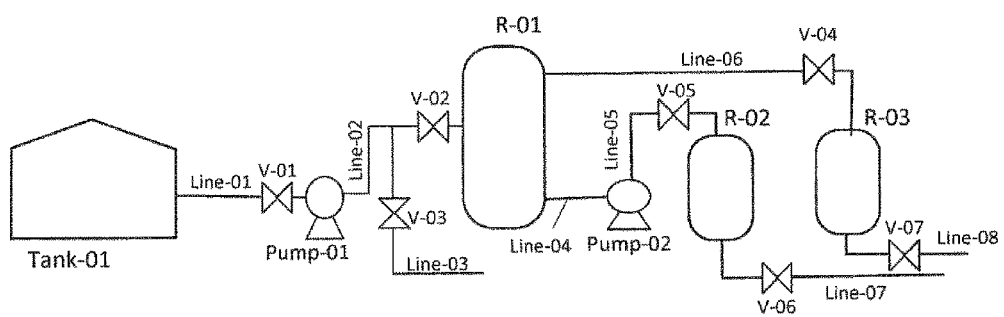
FIG. 2 is a diagram showing an example of an attribute system diagram.

Next, FIG. 2 shows an example of the attribute system diagram 1. FIG. 2 includes a tank, reactors R-01 to R-03, pipes Line-01 to Line-07, and valves V-01 to V-07. For example, the attribute information shown in FIGS. 3 and 4 is assigned to these.

Figures 3, 4, 5:
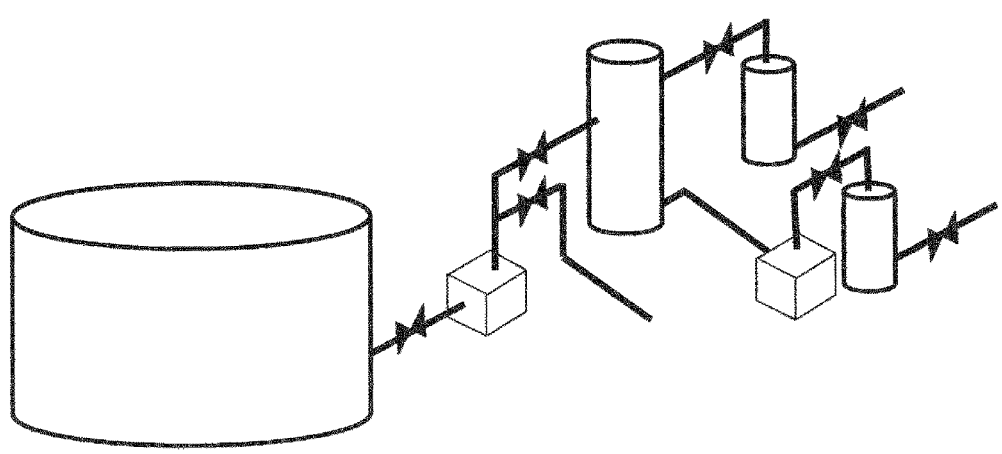
FIG. 3 is a diagram showing an example of equipment attribute information.
FIG. 4 is a diagram showing an example of pipe attribute information.
FIG. 5 is a diagram showing an example of a 3D model with no attributes.

FIG. 5 shows an example of the 3D model with no attributes 2. As shown in FIG. 5, the object such as the tank, the equipment, the valve, and the pipe are arranged, but in the present embodiment, no attribute is assigned to each object. However, object IDs are automatically allocated on the 3D model in order to distinguish the objects.

Figures 6, 7:
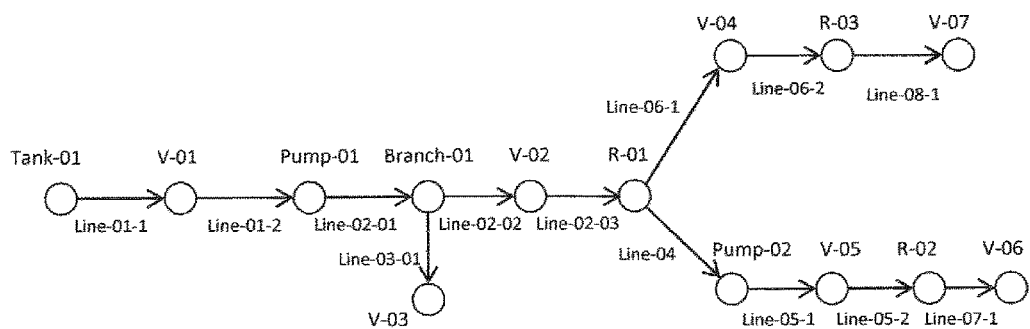
FIG. 6 is a diagram showing an example of system diagram connection information.
FIG. 7 is an example of a directed graph of a system diagram.

The system information extraction part 3 acquires the system connection information from the attribute system diagram 1. Basically, the connection information is acquired by units of the pipe number, but when there are valves on one same pipe number and when there is a branch, a branch number is added before and after the valve and the branch, and the connection information is acquired by units of a branch number-added pipe number. For example, in an example of Line-02 in FIG. 2, since there is the branch and a valve V-02, the Line-02 is divided into three branch number-added pipe numbers, Line-02-01, Line-02-02, and Line-02-03. In a case of the Line-02-01, a start point (From) is Pump-01, an end point (To) is Branch-01, and in the Line-02-02, From is the Branch-01 and To is the V-02. As described above, From and To information, that is, system diagram connection information is acquired for each branch number-added pipe number. FIG. 6 shows the acquired system diagram connection information.

By using this information, P&ID information can be formed into the directed graph. For example, in a case of the P&ID shown in FIG. 2, the directed graph can be formed as shown in FIG. 7.

Next, a function of the 3D model connection information extraction part 4 will be described with reference to a part of the 3D model with no attributes shown in FIG. 8. In the present embodiment, only the object IDs (Obj-101 to Obj-107, Obj-151 to Obj-154) are assigned to the 3D model. However, an object class of the 3D model is defined. The object class represents a type of the 3D model. For example, for each piece of CAD software, the equipment is defined as Equipment, and the pipe is defined as Pipe. In an example shown in FIG. 8, the Obj-101 and the Obj-107 are an Equipment class, Obj-105 is a Valve class, Obj-151 is a Fitting class, and the rest is a Pipe class. In addition, usually, class information classified in more detail is also defined. For example, it is possible to distinguish between a reducer and a stub in Fitting.

The 3D model connection information extraction part 4 acquires the connection information for units of objects. FIG. 9 shows an obtained example. For example, for Obj-102, From is the Obj-101 and To is Obj-103. Since a connection direction is not set in the 3D model of the present embodiment shown in FIG. 8, From-To information (that is, the connection direction) is acquired in a direction starting from the Obj-101 as shown in FIG. 9.

Figures 8, 9:
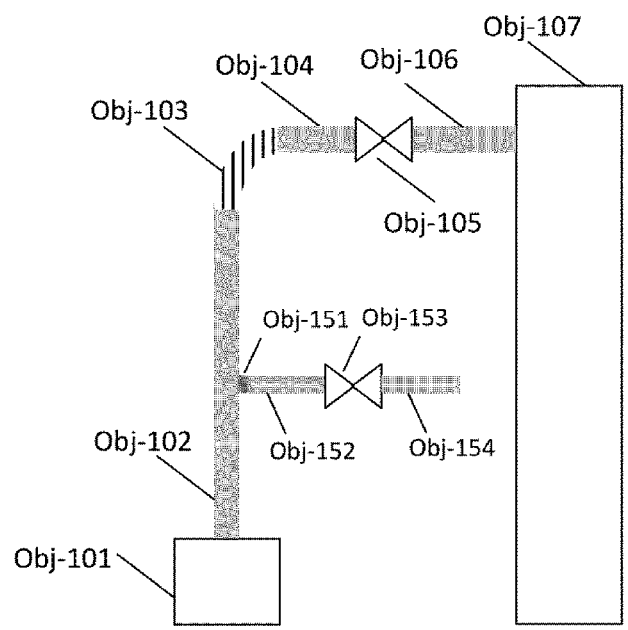
FIG. 8 is a diagram showing a part of a 3D model with no attributes.
FIG. 9 shows an example of connection information of a 3D graph.

The connection information conversion part 5 converts information such that the connection information shown in FIG. 9 can be compared with the connection information acquired from the P&ID. Specifically, a conversion is performed according to the following two rules, and a graph showing a result thereof is created.

Rule 1: When a connection method of a branch pipe (branch pipe) is a stub, a connection source pipe (mother pipe) is virtually divided into two objects at a branch point, and the branch point is also the object.

Rule 2: Each object including the branch point is defined as a node, and a connection relationship between objects is defined as an edge in the description of the connection information. Here, the connection relationship between objects is not a real thing like the pipe or the valve. However, depending on a type of the CAD, a virtual object of the CAD may be arranged on the 3D model. In that case, the virtual object is assigned to the edge. In addition, when there is no virtual object, a new edge representing the connection relationship is created.

In the present embodiment, the branch "pipe" is described as an example, but the invention is not limited thereto, and is applicable to a branch connection that connects the plurality of parts (objects). In this case, the stub should just be a branch connection part (object) attached for the branch connection.

FIG. 10 shows a result of converting the 3D model shown in FIG. 8 using Rule 1 and Rule 2. That is, since the Obj-151 is the stub, the Obj-102, which is a connection source of the stub, is divided into Obj-102-1 and Obj-102-2, and a branch point object Obj-301 is generated between the Obj-102-1 and the Obj-102-2. For this reason, the Obj-151 which is the stub is connected to the branch point object Obj-301. In addition, each object (for example, all objects) of the 3D model becomes a node, and the connection relationship thereof is represented by the edge.

Next, among the nodes, equipment, valves, branch points, and Tee are kept as the nodes, and other nodes are converted into edges. In this example, since the Obj-101, the Obj-301, the Obj-105, the Obj-107, and Obj-153 are equipment, valves and branch points, others are converted to the edges. FIG. 11 shows a network after the conversion. Here, a name of the edge connecting the Obj-101 and the Obj-301 is Obj-201, and the edge connecting the Obj-301 and the Obj-105 is Obj-202. This is a number assigned by automatic numbering. By comparing FIG. 11 and FIG. 10, the correspondence shown in FIG. 12 is obtained. For example, it can be seen that the Obj-102-1 is converted into the Obj-201, and the Obj-102-2 to Obj-104 are converted into the Obj-202. Similarly, when the connection information (for example, all connection information) is separately converted and displayed in a format of the directed graph, a result is as shown in FIG. 13.

Figures 13, 14:
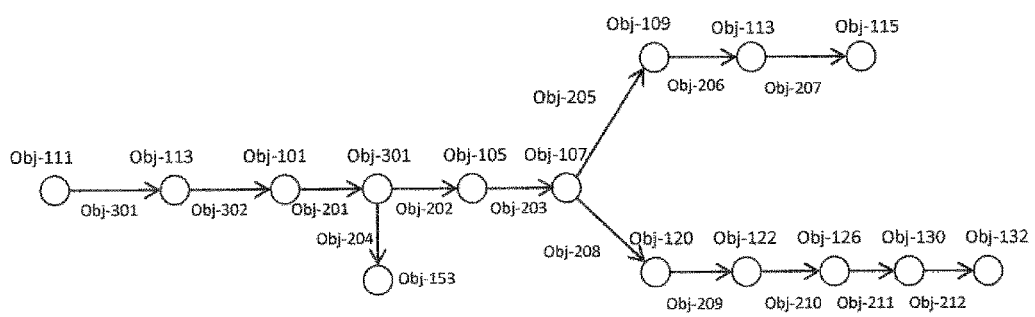
FIG. 13 is a diagram showing an example of a directed graph of the 3D model.
FIG. 14 is a diagram showing an example of a conversion correspondence table between the 3D model and the attribute system diagram.

The extraction information comparing part 6 compares the directed graph shown in FIG. 7 with the directed graph shown in FIG. 13. By comparing these two, it is possible to acquire the correspondence between the object ID in FIG. 13 and an equipment number and the pipe number of the P&ID.

In the present embodiment, the graphs are compared in the following procedure.

Step S1: The graph is divided by the nodes (branch nodes) where three or more edges are connected to one node. The network after the division becomes one graph with both ends being an end node or a branch node (hereinafter, referred to as a branch graph). In an example of FIG. 7, five branch graphs are generated as shown in branch graph management information (part 1) in FIG. 19. Similarly, the branch graphs generated from FIG. 13 are shown in branch graph management information (part 2) in FIG. 20.

Step S2: An association is made in units of the branch graphs in FIGS. 19 and 20, that is, a matching between directed graphs is performed. Information used for the association includes a node name, node divisions (end point, branch), node attributes (Equipment, Valve, Branch), and the number of the nodes. Specifically, the association is made by an algorithm shown in FIG. 21. Hereinafter, each step of FIG. 21 will be described.

Step S2-1:

The branch graphs extracted from each graph are classified by the number of the nodes. In examples of FIGS. 19 and 20, there is one branch graph with two, three, and five nodes, respectively. There are two branch graphs with four nodes.

Step S2-2:

The branch graphs with the same number of nodes are compared, and end points are associated with each other based on the node divisions and the node attributes. For example, in a branch graph P2 and a branch graph D2 having two nodes, a node division and a node attribute of an end point (1) are (branch, Branch), and those of an end point (2) are (end point, Valve). Therefore, the Branch-01 and the Obj-301, and V-03 and the Obj-153 are associated with each other.

Figures 18, 19:
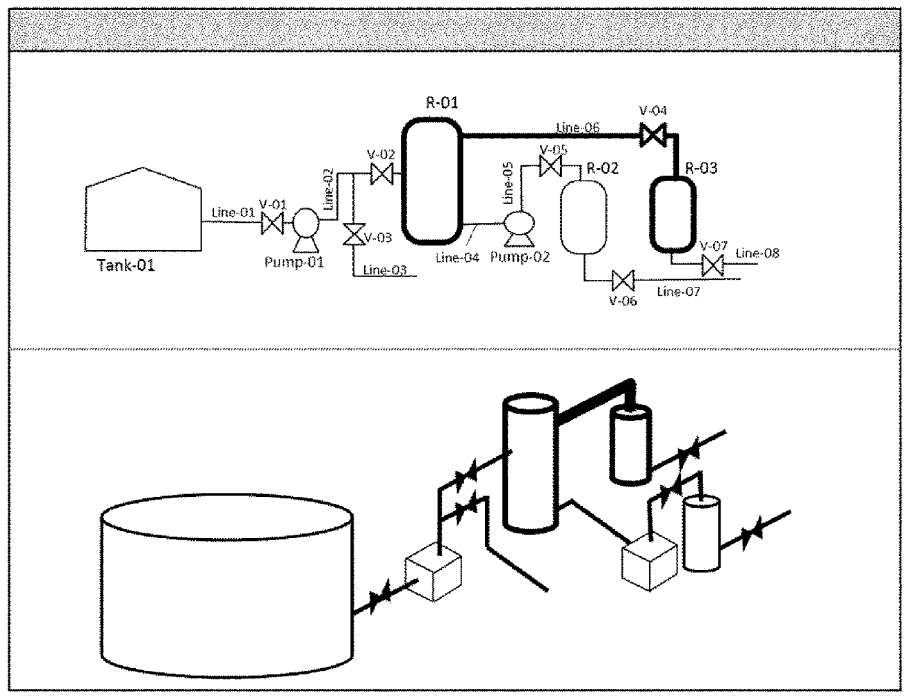
FIG. 18 is a diagram showing a screen example of a mismatch information display part.
FIG. 19 shows branch graph management information (part 1).

In addition, the branch graphs having four nodes include the branch graphs P1 and P4 in FIG. 19, and D1 and D4 in FIG. 20. However, the node divisions and the node attributes are different for each pair, by comparing these, Tank-01 and Obj-111, the Branch-01 and the Obj-301, the R-01 and the Obj-107, and the V-07 and Obj-115 can be associated with each other. The same number of the nodes also includes a case where a difference thereof is equal to or less than a certain threshold. In a comparison between the branch graphs, a classified branch graph may be sorted by the number of the nodes, and the numbers may be associated in a descending or ascending order.

Step S2-3:

In the present embodiment, there is no such branch graph, but when it is not possible to make the association only with these pieces of information, the association is made using information other than the end points. When there is a branch graph that still cannot be associated, a message that the association cannot be made is displayed, and this step is ended.

With the above steps, a graph created from the P&ID and a graph created from the 3D model can be associated with each other.

Generally, as a method of comparing two effective graphs and associating the graphs, there is a method called a graph isomorphism determination method. Therefore, the correspondence between the graphs shown in FIGS. 7 and 13 of the present embodiment may be acquired by using the graph isomorphism determination method. In addition, in the present embodiment, a processing is performed using the number of nodes as a key, but the processing may be similarly performed using the number of edges.

The acquired correspondence is stored in the conversion correspondence DB 7. An example is shown in FIG. 14. In FIG. 14, P&ID attributes are add to the correspondence shown in FIG. 12.

The attribute assigning part 8 assigns the attributes to the 3D model based on the information in the conversion correspondence DB 7. The attributes is assigned in two steps.

In a first step, a pre-conversion ID of the 3D model shown in FIG. 14 is used as the key, and a corresponding P&ID number is assigned. However, as for the pipe number to which the branch number is assigned, a number without the branch number is assigned. For example, the pipe number corresponding to the Obj-102 is the Line-02-01, but the Line-02 excluding a branch number "-01" is assigned. This is because the number described in the attribute system diagram 1 does not have the branch number.

Figure 15:
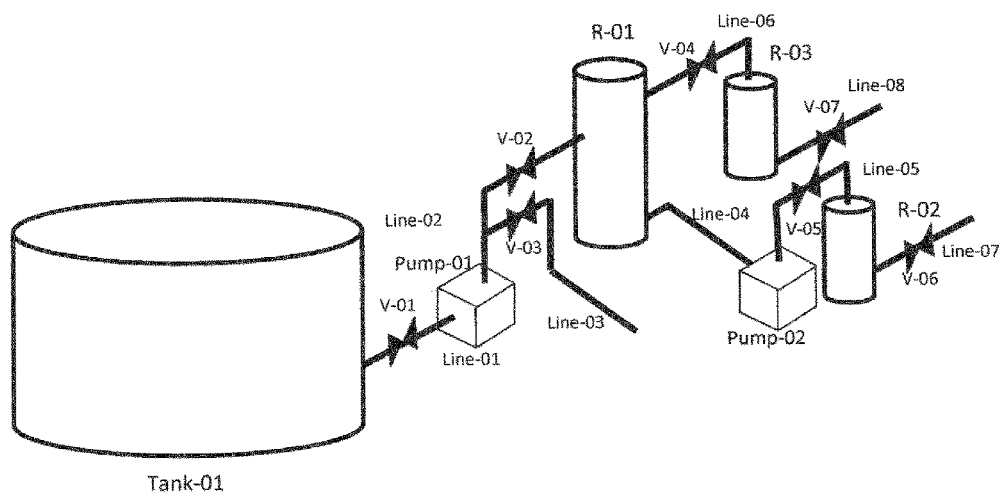
FIG. 15 is a diagram showing an example of a 3D model with attributes.
Figure 15:
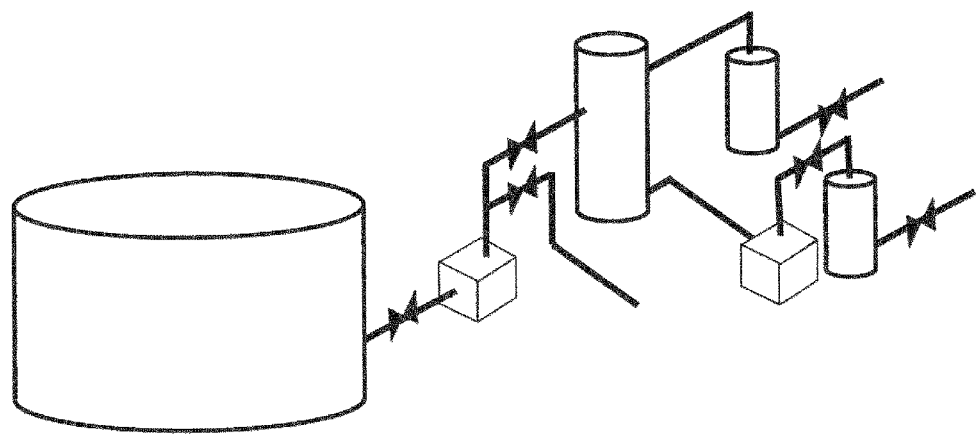

In a second step, a P&ID number is used as the key, and other attribute information of a system diagram is assigned. For example, in a case of the pipe, the information such as the outer diameter, the wall thickness, and a type of heat insulating material, which are the P&ID attribute information, is also stored in the 3D model. Accordingly, the 3D model with attributes 9 is created. Actually, no attribute is displayed on the CAD (a lower part in FIG. 15), but number information and other attribute information are allocated as in an upper part in FIG. 15.

As described above, according to the present embodiment, the 3D model with no attributes can be easily changed to the 3D model with attributes, and a parts management system, a maintenance information management system or the like utilizing the 3D model with attributes can be implemented.

Figure 16:
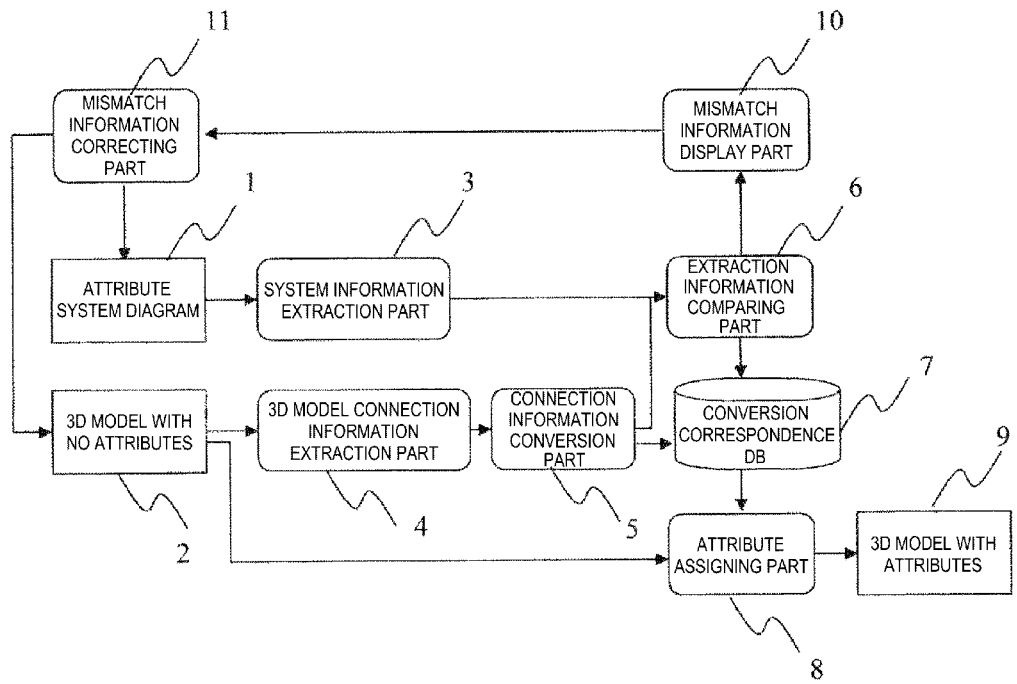
FIG. 16 is a diagram showing a configuration of a plant 3D model creation system according to a second embodiment of the invention.

Next, a second embodiment of the invention will be described. FIG. 16 shows a configuration of a plant 3D model creation system according to the second embodiment. The second embodiment differs from the first embodiment in that a mismatch information display part 10 and a mismatch information correcting part 11 are included. That is, to deal with a case where the information acquired by the system information extraction part 3 and the connection information of the 3D model output by the connection information conversion part 5 are compared, there is a mismatch therebetween, and the correspondence cannot be acquired. Hereinafter, the mismatch information display part 10 and the mismatch information correcting part 11 will be described.

The mismatch information display part 10 detects and displays the mismatch in network structures extracted from the attribute system diagram and from the 3D model.

Figure 17:
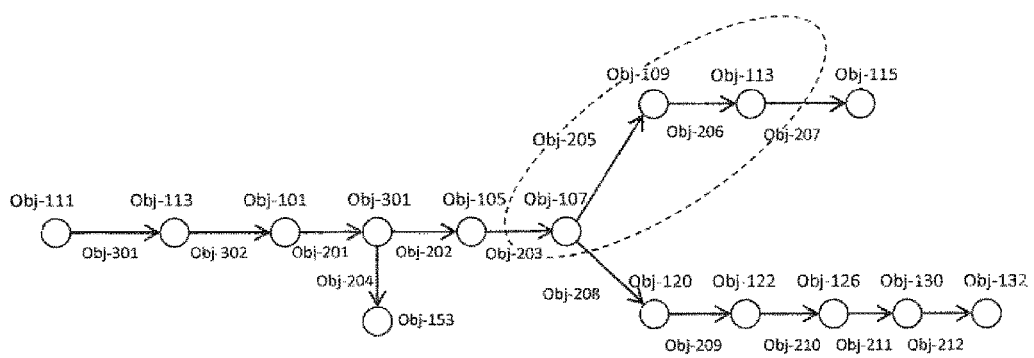
FIG. 17 is a diagram showing an example in which graph information is mismatched.
Figure 17:
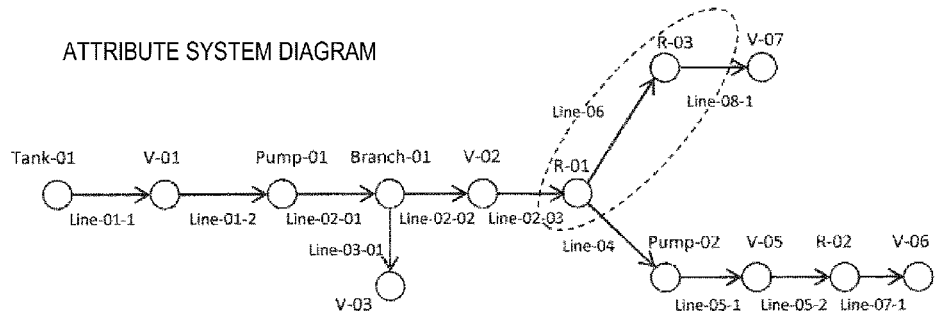

For example, it is assumed that both network structures are as shown in FIG. 17. According to a network matching function, there is no solution to match completely even though these two are matched as much as possible, and it can be seen that structures of portions surrounded by broken lines are different from each other. In a 3D model side, the pre-conversion ID is known based on a post-conversion ID, and the parts on the 3D model can be specified. In addition, since the number of the system diagram on a system diagram side is described, a site of the system diagram can also be specified. As a specified result, for example, the system diagram and the 3D model are displayed as shown in FIG. 18, and a mismatch position can be visualized by highlighting a mismatch portion.

The mismatch information correcting part 11 corrects the system diagram or the 3D model based on a display result. This correction is made manually after a user confirms correct information. However, as long as it is specified in advance whether the correct information is the system diagram or the 3D model, it can be automatically corrected according to a specified rule. In an example shown in FIG. 18, a highlighted portion includes the valve on the system diagram, but does not include the valve on the 3D model. When the 3D model is defined as the correct information, the valve is deleted from the system diagram.

According to the above parts, when the information acquired by the system information extraction part 3 and the connection information of the 3D model output by the connection information conversion part 5 are compared, the 3D model with attributes can be created even if there is a mismatch between the information.

What is claimed is:

1. A 3D model creation support system for creating a 3D model of a target constituted by a plurality of objects, the 3D model creation support system comprising:
a computer coupled to a memory,
wherein the memory stores a 3D model with no attributes of the target, and an attribute system diagram in which attributes of the objects constituting the target including different types of objects are recorded, the attribute system diagram and the 3D model are CAD diagrams,
wherein the computer is programmed to:
automatically extract, from the attribute system diagram, first connection information indicating a connection relationship among the objects constituting the target,
extract, from the 3D model with no attributes, second connection information indicating the connection relationship among the objects constituting the target,
convert the extracted second connection information into a format that is able to be compared with the first connection information using design information of the target, and
compare the first connection information with the converted second connection information to specify a correspondence,
assign the attributes included in the attribute system diagram to the 3D model with no attributes using the correspondence,
create a 3D model with attributes, and
display the created 3D model with attributes on a display,
wherein the conversion of the extracted second connection information into a format that is able to be compared with the first connection information is performed based on a first rule and a second rule,
wherein the first rule is that when the first connection information and the second connection information indicate a branch connection is used for a branch connection object and a first branch of the branch connection is a stub object, a connection source is virtually divided into two objects having separate identification information and the virtually divided two objects are adjacent to the branch connection object,
wherein the second rule is each object including the branch connection object is defined as a node, and a connection relationship between objects is defined as an edge.

2. The 3D model creation support system according to claim 1,
wherein the computer is programmed to:
classify the objects in the attribute system diagram into a node or an edge as the first connection information, and
classify the objects in the 3D model into a node or an edge using the design information.

3. The 3D model creation support system according to claim 2,
wherein the computer is programmed to:
create a first graph with classified nodes and edges as configuration components,
create a second graph with classified nodes and edges as configuration components, and
compare the first graph and the second graph.

4. The 3D model creation support system according to claim 1,
wherein the computer is programmed to:
display a mismatch position when the mismatch position is present between the first connection information and the correspondingly converted second connection information in a comparison of the extraction information comparing part.

5. The 3D model creation support system according to claim 4,
wherein the computer is programmed to correct the displayed mismatch position in an attribute system diagram or a 3D model with no attributes.

6. A 3D model creation support method used in a 3D model creation support system for creating a 3D model of a target constituted by a plurality of objects, the 3D model creation support method comprising:
storing, in a storage part of the 3D model creation support system, a 3D model with no attributes of the target and an attribute system diagram in which attributes of the objects constituting the target including different types of objects are recorded, the attribute system diagram and the 3D model are CAD diagrams;
automatically extracting, from the attribute system diagram, first connection information indicating a connection relationship among the objects constituting the target;
extracting, from the 3D model with no attributes, second connection information indicating the connection relationship among the objects constituting the target;
converting the extracted second connection information into a format that is able to be compared with the first connection information using design information of the target;
comparing the first connection information with the converted second connection information to specify a correspondence;
assigning the attributes included in the attribute system diagram to the 3D model with no attributes using the correspondence;
creating a 3D model with attributes; and
displaying the created 3D model with attributes on a display,
wherein the conversion of the extracted second connection information into a format that is able to be compared with the first connection information is performed based on a first rule and a second rule,
wherein the first rule is that when the first connection information and the second connection information indicate a branch connection is used for a branch connection object and a first branch of the branch connection is a stub object, a connection source is virtually divided into two objects having separate identification information and the virtually divided two objects are adjacent to the branch connection object,
wherein the second rule is each object including the branch connection object is defined as a node, and a connection relationship between objects is defined as an edge.

7. The 3D model creation support method according to claim 6, wherein
in an extraction of the first connection information, the objects in the attribute system diagram are classified into a node or an edge as the first connection information, and
in a conversion of the second connection information, the objects in the 3D model are classified into a node or an edge using the design information.

8. The 3D model creation support method according to claim 7, wherein in the extraction of the first connection information, a first graph with classified nodes and edges as configuration components is created, in the conversion of the second connection information, a second graph with classified nodes and edges as the configuration components is created, and in a comparison between the first connection information and the converted second connection information, the first graph is compared with the second graph.

9. The 3D model creation support method according to claim 2, further comprising:

displaying a mismatch position between the first connection information and the correspondingly converted second connection information.

10. The 3D model creation support method according to claim 9, further comprising:

correcting the mismatch position in the attribute system diagram or the 3D model with no attributes.

* * * * *